United States Patent
He et al.

(10) Patent No.: US 11,987,530 B1
(45) Date of Patent: May 21, 2024

(54) PHASE INVERSION PORE-FORMING AGENT AND PORE-FORMING METHOD FOR FLY ASH-BASED CERAMIC FLAT MEMBRANE SUPPORT

(71) Applicant: Central South University, Changsha (CN)

(72) Inventors: Zhiguo He, Changsha (CN); Hui Zhong, Changsha (CN); Weiqi Xie, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 18/398,832

(22) Filed: Dec. 28, 2023

(30) Foreign Application Priority Data

Dec. 30, 2022 (CN) .......................... 202211737587.5

(51) Int. Cl.
| | |
|---|---|
| *C04B 35/622* | (2006.01) |
| *B28B 11/24* | (2006.01) |
| *C04B 35/18* | (2006.01) |
| *C04B 35/626* | (2006.01) |
| *C04B 35/64* | (2006.01) |
| *C04B 38/04* | (2006.01) |

(52) U.S. Cl.
CPC ............ *C04B 35/18* (2013.01); *B28B 11/247* (2013.01); *C04B 35/62204* (2013.01); *C04B 35/6264* (2013.01); *C04B 35/6269* (2013.01); *C04B 35/64* (2013.01); *C04B 38/04* (2013.01); *C04B 2235/3463* (2013.01); *C04B 2235/6021* (2013.01); *C04B 2235/606* (2013.01)

(58) Field of Classification Search
CPC ....................... C04B 35/62204; B28B 11/247
See application file for complete search history.

(56) References Cited

U.S. PATENT DOCUMENTS

| | | | | |
|---|---|---|---|---|
| 2013/0131220 | A1* | 5/2013 | Zapf | C04B 24/2641 524/533 |
| 2021/0362098 | A1* | 11/2021 | Li | B01D 71/68 |

FOREIGN PATENT DOCUMENTS

| | | | | | |
|---|---|---|---|---|---|
| CN | 102875128 | A | * | 1/2013 | |
| CN | 108264338 | A | * | 7/2018 | .......... C04B 35/185 |
| CN | 112661492 | A | * | 4/2021 | |

(Continued)

OTHER PUBLICATIONS

CN 115159957 A (Dong) Oct. 11, 2022 (English language translation). [online] [retrieved Feb. 21, 2024]. Retrieved from: Clarivate Analytics. (Year: 2022).*

(Continued)

*Primary Examiner* — Erin Snelting
(74) *Attorney, Agent, or Firm* — Van Hoven PC; STEFAN D. OSTERBUR

(57) ABSTRACT

The present disclosure provides a phase inversion pore-forming agent and a pore-forming method for a fly ash-based ceramic flat membrane support. The phase inversion pore-forming agent includes poly(oxyphenylene sulfone) and N-methylpyrrolidone (NMP), and is used in a preparation process of the fly ash-based ceramic flat membrane support. Pores can be formed through phase inversion, forming straight-through pores with gradient distribution inside the ceramic flat membrane support, thus avoiding a low porosity, a poor water flux, and uneven pore formation of the existing fly ash-based ceramic flat membrane support.

4 Claims, 1 Drawing Sheet

(56) References Cited

FOREIGN PATENT DOCUMENTS

CN     113698225 A  * 11/2021
CN     115159957 A  * 10/2022

OTHER PUBLICATIONS

CN 112661492 A (Ding) Apr. 16, 2021 (English language translation). [online] [retrieved Feb. 21, 2024]. Retrieved from: Clarivate Analytics. (Year: 2021).*
CN 108264338 A (Zhu) Jul. 10, 2018 (English language translation). [online] [retrieved Feb. 21, 2024]. Retrieved from: Clarivate Analytics. (Year: 2018).*
CN 102875128 A (Cheng) Jan. 16, 2013 (English language translation). [online] [retrieved Feb. 21, 2024]. Retrieved from: Clarivate Analytics. (Year: 2013).*
CN 113698225 A (Chen) Nov. 26, 2021 (English language translation). [online] [retrieved Feb. 21, 2024]. Retrieved from: Clarivate Analytics. (Year: 2021).*
Tai, Z.S., et al. (2021) Design and characterization of ceramic hollow fiber membrane derived from waste ash using phase inversion-based extrusion/sintering technique for water filtration, Journal of Asian Ceramic Societies, 9:1, 341-358, DOI: 10.1080/21870764.2020.1868080 (Year: 2021).*
Li, L., et al. A low-cost alumina-mullite composite hollow fiber ceramic membrane fabricated via phase-inversion and sintering method, Journal of the European Ceramic Society, vol. 36, Issue 8, 2016, pp. 2057-2066, ISSN 0955-2219, https://doi.org/10.1016/j.jeurceramsoc.2016.02.020. (Year: 2016).*
Paiman, S.H., et al. Morphological study of yttria-stabilized zirconia hollow fibre membrane prepared using phase inversion/sintering technique, Ceramics International, vol. 41, Issue 10, Part A, 2015, pp. 12543-12553, ISSN 0272-8842, https://doi.org/10.1016/j.ceramint.2015.06.066. (Year: 2015).*
Onutai, S., et al. Porous fly ash-based geopolymer composite fiber as an adsorbent for removal of heavy metal ions from wastewater, Materials Letters, vol. 236, 2019, pp. 30-33, ISSN 0167-577X, https://doi.org/10.1016/j.matlet.2018.10.035. (Year: 2019).*
First Office Action received in Chinese Application No. 202211737587.5, Issued by China National Intellectual Property Administration, dated Jun. 26, 2023, 7 pages.
Yawen, Hu, "Casting Slurry Composition Tailoring on Microstructure of Ceramic Substrate Prepared by Phase Inversion Method", China Sciencepaper, vol. 10, No. 10, May 2015, 19 pages.
Zulkifli, Siti Nur Afiquah, et al., "Characteristics Properties of Ceramic Membrane Derived from Fly Ash with Different Loadings and Sintering Temperature", Malaysian Journal of Fundamental and Applied Sciences, vol. 15, No. 3, Jun. 25, 2019, pp. 414-420.

* cited by examiner

PHASE INVERSION PORE-FORMING AGENT AND PORE-FORMING METHOD FOR FLY ASH-BASED CERAMIC FLAT MEMBRANE SUPPORT

CROSS REFERENCE TO RELATED APPLICATION

This patent application claims the benefit and priority of Chinese Patent Application No. 202211737587.5, filed with the China National Intellectual Property Administration on Dec. 30, 2022, the disclosure of which is incorporated by reference herein in its entirety as part of the present application.

TECHNICAL FIELD

The present disclosure relates to a phase inversion pore-forming agent, in particular to a phase inversion pore-forming agent for pore-forming of a fly ash-based ceramic flat membrane support, as well as a pore-forming method for a fly ash-based ceramic flat membrane support, and belongs to the technical field of ceramic membrane preparation.

BACKGROUND

Fly ash is tiny ash particles emitted during the combustion of fuel (mainly coal), with a particle size generally ranging from 1 μm to 100 μm. The fly ash is also called soot. The fly ash is fine solid particles in the flue gas ash produced by fuel combustion. For example, fine ash collected from flue gases in coal-fired power plants can be considered fly ash. According to coal consumption in China, burning 1 t of coal produces approximately 250 kg to 300 kg of the fly ash. If not being well controlled or treated, large amounts of the fly ash can cause air pollution, enter water bodies to block rivers; moreover, some of chemical substances in the fly ash cause harm to organisms and human bodies.

Fly ash mainly contains silica ($SiO_2$), alumina ($Al_2O_3$), and iron oxide ($Fe_2O_3$), and has been widely used to produce cement and various lightweight building materials. Fly ash-based ceramic flat membranes can be used in the water treatment industry to effectively utilize fly ash-derived solid wastes.

Ceramic flat membranes for water treatment require high porosity and high water flux. The currently-used pore-forming agents generally include ingredients such as starch and graphite, which are mixed as dry powders through a mixer. Since a density and a specific gravity of the fly ash are quite different from those of the above pore-forming agents, it is difficult to achieve uniformity and stability during the mixing. In this way, it is easy for the pore-forming agent to agglomerate inside and then form uneven cavities during the sintering. Moreover, there are many disconnected holes, leading to a limited water flux improvement.

SUMMARY

In view of the technical problems such as low porosity, uneven pore formation, and poor water flux in the preparation of fly ash-based ceramic flat membranes in the prior art, a first objective of the present disclosure is to provide a phase inversion pore-forming agent. The phase inversion pore-forming agent can form pores through phase inversion, and can form straight-through pores with gradient distribution, which is beneficial to improving a porosity and a filtration efficiency of the ceramic flat membranes.

A second objective of the present disclosure is to provide a pore-forming method for a fly ash-based ceramic flat membrane support. The pore-forming method mixes a special phase inversion pore-forming agent into the fly ash, so as to achieve forming pores and stabilizing a pore structure through phase inversion of the pore-forming agent. Therefore, the straight through-holes with gradient distribution are formed inside the ceramic flat membrane support, and are beneficial to improving the porosity and filtration efficiency of the ceramic flat membrane support.

In order to achieve the above technical objectives, the present disclosure provides a phase inversion pore-forming agent of a ceramic material, including poly(oxyphenylene sulfone) and N-methylpyrrolidone (NMP).

In the present disclosure, the phase inversion pore-forming agent includes poly(oxyphenylene sulfone) and NMP. The poly(oxyphenylene sulfone) is dissolved in the NMP to form a solution, which is mixed with ceramic material. Compared with solid pore-forming agents, this phase inversion pore-forming agent has more obvious advantages and is more uniformly mixed with raw materials. After the raw materials are formed, water can be added to dissolve and removed the NMP by replacement to form pores. At the same time, the removal of NMP changes the poly(oxyphenylene sulfone) from liquid to solid, which plays a supporting role in the pores left by the dissolution of NMP. Finally, during the sintering, with the removal of poly(oxyphenylene sulfone), straight-through holes can be formed inside the ceramic material.

Preferably, the phase inversion pore-forming agent includes the poly(oxyphenylene sulfone) and the NMP at a mass ratio of 1:(3.5-5). The poly(oxyphenylene sulfone) has a data molecular weight generally ranging from 4,100 to 4,800. An excessive ratio of poly(oxyphenylene sulfone) to NMP makes it difficult for poly(oxyphenylene sulfone) to be fully dissolved into NMP; while an insufficient ratio of poly(oxyphenylene sulfone) to NMP results in the inability to form straight-through holes during phase inversion.

In the present disclosure, a preparation process of the phase inversion pore-forming agent includes: preparing the poly(oxyphenylene sulfone) and the NMP in a proportion, and stirring by heating at 50° C. to 75° C. for 5 h to 7 h in a stirrer until completely dissolved.

The present disclosure further provides a pore-forming method for a fly ash-based ceramic flat membrane support, including: mixing fly ash with the phase inversion pore-forming agent and an oil additive, and then conducting aging and extrusion molding to obtain a green body; and subjecting the green body to static curing in a constant-temperature and constant-humidity environment, placing in water to allow phase inversion, and then conducting drying and sintering.

Preferably, the phase inversion pore-forming agent and the fly ash are at a mass ratio of (1-2):4. An insufficient addition ratio of the phase inversion pore-forming agent cannot achieve improving the porosity and filtration efficiency of the ceramic flat membrane; while an excessive addition ratio of the phase inversion pore-forming agent may affect the mechanical properties of the ceramic flat membrane.

Preferably, the oil additive includes glycerol, oleic acid, and tung oil. The oil additive is mainly used for lubrication and moisturizing to ensure smooth demolding during the extrusion. The combination of glycerol, oleic acid, and tung oil can improve a qualification rate of the extruded support and prevent cracking of the support during the drying.

Preferably, the oil additive includes the glycerol, the oleic acid, and the tung oil at a mass ratio of (1.2-2):1:(1.5-2.5). The glycerol is mainly used as a water-retaining agent: an excessive addition ratio can cause the support to collapse, while an insufficient addition ratio can cause cracking during the drying. The oleic acid is used as a water-reducing agent: an excessive addition ratio may lead to low moisture content of the support and cannot be extruded, while an insufficient addition ratio may lead to high moisture content of the support and easy deformation during the drying. The tung oil is used as a lubricant: an excessive addition ratio can affect the molding effect of the support, while an insufficient addition ratio can increase the extrusion resistance and reduce the pass rate.

Preferably, the oil additive and the fly ash are at a mass ratio of (0.8-1.5):10. An excessive proportion of the oil additive causes the support to become tougher and prone to bending after drying; while an insufficient proportion of the oil additive causes the support to become less plastic and unable to conduct extrusion molding.

Preferably, the static curing is conducted with a humidity of 90% to 95% relative humidity (rh) at 35° C.±3° C. for 4 h to 6 h. The phase inversion pore-forming agent is directly introduced into the green body of the ceramic membrane support in the form of a mixed solution. The green body is placed in a constant-temperature and constant-humidity environment with a high humidity and keeps its surface moist. The pore-forming agent and water are dissolved to form pores.

Preferably, the phase inversion is conducted at 25° C. to 35° C. for 5 h to 8 h.

Compared with the prior art, the technical solutions of the present disclosure bring the following beneficial technical effects:

In the present disclosure, the phase inversion pore-forming agent is a mixed solution formed by poly(oxyphenylene sulfone) dissolved in NMP, and is mixed with the fly ash in a liquid state, thereby improving the uniformity of the pore-forming agent in the ceramic mud. The NMP in the mixed solution is also miscible with water. In the process of being miscible with water, the poly(oxyphenylene sulfone) changes from liquid to solid through phase inversion, plays a supporting role in the pores left by the dissolution of NMP, and then forms straight through-holes inside the fly ash-based ceramic flat membrane, thereby improving the porosity and filtration efficiency of the fly ash-based ceramic flat membrane.

DETAILED DESCRIPTION OF THE EMBODIMENTS

Figure 1:
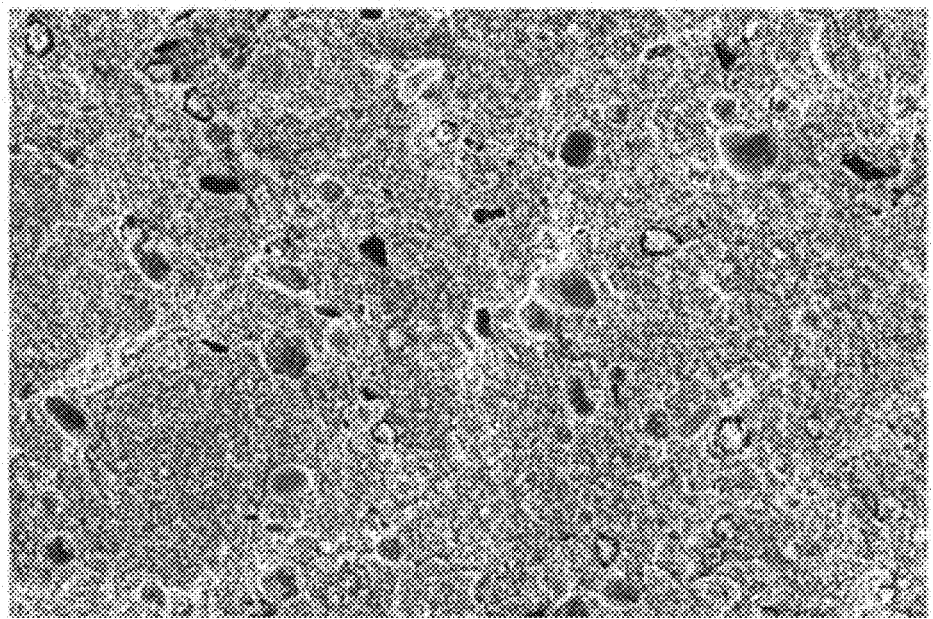
FIG. 1 shows a microphotograph of a pore structure obtained when starch is used as a pore-forming agent in Comparative Example 2.
Figure 2:
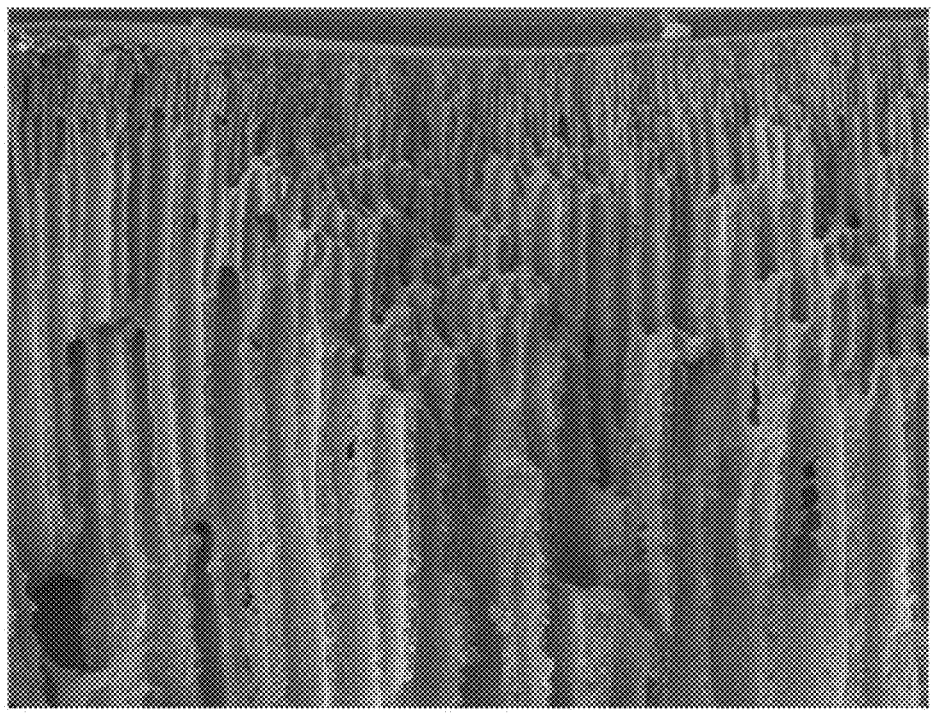
FIG. 2 shows a microphotograph of a pore structure obtained using the phase inversion pore-forming agent in Example 1; where as shown in the comparison between FIG. 1 and FIG. 2, the support prepared by the phase inversion pore-forming agent has a higher porosity than that of the starch pore-forming agent; moreover, after phase inversion to form pores, pore channels are straight and there is low material transmission resistance.

The following examples are intended to further illustrate the protection content of the present disclosure and are not intended to limit the protection scope of the present disclosure.

All chemical reagents relate in the following examples are commercially available products, unless otherwise specified.

Example 1

1. 260 g of poly(oxyphenylene sulfone) (with a molecular weight of 4,200) and 1,040 g of NMP were stirred at 50° C. for 6 h until completely dissolved to form a mixed solution.
2. 150 g of tung oil, 150 g of glycerol, and 100 g of oleic acid were stirred at a room temperature for 10 min.
3. 4 kg of fly ash and the mixed solution were mixed through a mixer for 10 min, then added with an oil mixture obtained in step 2 and stirred for 5 min.
4. An obtained ceramic mud was further mixed with a pugging machine to achieve a certain plasticity; after the pugging was completed, the ceramic mud was aged in a aging room at 25° C. for 24 h.
5. An obtained aged ceramic mud was subjected to extrusion molding through an extruder, and then a resulting extruded green body was allowed to stand in an environment of 95% rh at 35° C. for 4 h; the green body was placed in pure water to allow phase inversion with water for 5 h at a room temperature, such that the NMP in the green body was dissolved into the water through capillary action, forming pores with a gradient in the green body.
6. The green body obtained in step 5 was subjected to conventional drying and sintering to form a fly ash-based ceramic flat membrane support with a gradient pore structure.

Example 2

1. 200 g of poly(oxyphenylene sulfone) (with a molecular weight of 4,200) and 1,000 g of NMP were stirred at 50° C. for 6 h until completely dissolved to form a mixed solution.
2. 250 g of tung oil, 200 g of glycerol, and 100 g of oleic acid were stirred at a room temperature for 10 min.
3. 4 kg of fly ash and the mixed solution were mixed through a mixer for 10 min, then added with an oil mixture obtained in step 2 and stirred for 5 min.
4. An obtained ceramic mud was further mixed with a pugging machine to achieve a certain plasticity; after the pugging was completed, the ceramic mud was aged in a aging room at 25° C. for 24 h.
5. An obtained aged ceramic mud was subjected to extrusion molding through an extruder, and then a resulting extruded green body was allowed to stand in an environment of 95% rh at 35° C. for 4 h; the green body was placed in pure water to allow phase inversion with water for 5 h at a room temperature, such that the NMP in the green body was dissolved into the water through capillary action, forming pores with a gradient in the green body.
6. The green body obtained in step 5 was subjected to conventional drying and sintering to form a fly ash-based ceramic flat membrane support with a gradient pore structure.

Example 3

1. 200 g of poly(oxyphenylene sulfone) (with a molecular weight of 4,600) and 900 g of NMP were stirred at 50° C. for 6 h until completely dissolved to form a mixed solution.
2. 150 g of tung oil, 120 g of glycerol, and 100 g of oleic acid were stirred at a room temperature for 10 min.
3. 4 kg of fly ash and the mixed solution were mixed through a mixer for 10 min, then added with an oil mixture obtained in step 2 and stirred for 5 min.

4. An obtained ceramic mud was further mixed with a pugging machine to achieve a certain plasticity; after the pugging was completed, the ceramic mud was aged in a aging room at 25° C. for 24 h.

5. An obtained aged ceramic mud was subjected to extrusion molding through an extruder, and then a resulting extruded green body was allowed to stand in an environment of 95% rh at 35° C. for 4 h; the green body was placed in pure water to allow phase inversion with water for 5 h at a room temperature, such that the NMP in the green body was dissolved into the water through capillary action, forming pores with a gradient in the green body.

6. The green body obtained in step 5 was subjected to conventional drying and sintering to form a fly ash-based ceramic flat membrane support with a gradient pore structure.

Comparative Example 1

1. 150 g of tung oil, 150 g of glycerol, and 100 g of oleic acid were stirred at a room temperature for 10 min.

2. 4 kg of fly ash was stirred through a mixer for 10 min, then added with an oil mixture obtained in step 1 and stirred for 5 min.

3. An obtained ceramic mud was further mixed with a pugging machine to achieve a certain plasticity; after the pugging was completed, the ceramic mud was aged in a aging room at 25° C. for 24 h.

4. An obtained aged ceramic mud was subjected to extrusion molding through an extruder, and then a resulting extruded green body was allowed to stand in an environment of 95% rh at 35° C. for 4 h.

5. The green body obtained in step 4 was subjected to conventional drying and sintering to form a fly ash-based ceramic flat membrane support.

Comparative Example 2

The operating steps were the same as those in Example 1, except that an equal amount of starch was used to replace the poly(oxyphenylene sulfone)-NMP mixed solution, as shown in FIG. 1.

TABLE 1

Comparison of properties of ceramic flat membranes prepared in Examples 1 to 3 and Comparative Examples 1 to 2

| | Support | | |
|---|---|---|---|
| Name | Strength (MPa) | Water flux ($m^3/m^2 \cdot h$) | Pore size · (μm) |
| Example 1 | 26 | 4.8 | 6.53 |
| Example 2 | 24 | 4.4 | 5.64 |
| Example 3 | 20 | 4.3 | 5.70 |
| Comparative Example 1 | 36 | 0.8 | 1.05 |
| Comparative Example 2 | 30 | 1.7 | 2.67 |

What is claimed is:

1. A pore-forming method for a fly ash-based ceramic flat membrane support, comprising: mixing fly ash with a phase inversion pore-forming agent and an oil additive, and then conducting aging and extrusion molding to obtain a green body; and subjecting the green body to static curing in a constant-temperature and constant-humidity environment, placing in water to allow phase inversion, and then conducting drying and sintering; wherein
the phase inversion pore-forming agent comprises poly (oxyphenylene sulfone) and N-methylpyrrolidone (NMP) at a mass ratio of 1:(3.5-5);
the oil additive comprises glycerol, oleic acid, and tung oil at a mass ratio of (1.2-2):1:(1.5-2.5); and
the phase inversion pore-forming agent and the fly ash are at a mass ratio of (1-2):4.

2. The pore-forming method for a fly ash-based ceramic flat membrane support according to claim 1, wherein the oil additive and the fly ash are at a mass ratio of (0.8-1.5):10.

3. The pore-forming method for a fly ash-based ceramic flat membrane support according to claim 2, wherein the static curing is conducted with a humidity of 90% to 95% relative humidity (rh) at 35° C.±3° C. for 4 h to 6 h.

4. The pore-forming method for a fly ash-based ceramic flat membrane support according to claim 3, wherein the phase inversion is conducted at 25° C. to 35° C. for 5 h to 8 h.

* * * * *